May 26, 1970 H. H. CLINTON 3,514,696
DEVICE FOR TESTING THE INTEGRITY OF ELECTRICAL WIRE INSULATION
BY MEANS OF HIGH VOLTAGE IMPULSER
Filed Sept. 5, 1968

INVENTOR.
Henry H. Clinton
BY
McCormick Paulding & Huber
ATTORNEYS

United States Patent Office 3,514,696
Patented May 26, 1970

3,514,696
DEVICE FOR TESTING THE INTEGRITY OF
ELECTRICAL WIRE INSULATION BY MEANS
OF HIGH VOLTAGE IMPULSES
Henry H. Clinton, Ridgewood, Clinton, Conn. 06413
Filed Sept. 5, 1968, Ser. No. 757,587
Int. Cl. G01r 31/14
U.S. Cl. 324—54          11 Claims

ABSTRACT OF THE DISCLOSURE

A device for testing the integrity of the insulation of an electrical wire or cable by means of high voltage impulses applied to the insulation consists of a capacitor repeatedly discharged through the primary winding of a step-up transformer having its secondary winding connected to a suitable electrode. Peak output voltage is measured by a tertiary winding on the transformer. A discriminating circuit connected to the same tertiary winding provides a signal which is a measure of the power dissipated in the electrode-wire path and which indicates a fault when it exceeds a predetermined value, whether such increased power dissipation is caused by a faulty area of insulation or by an electrical arc which penetrates a hole or weak spot in the insulation.

BACKGROUND OF THE INVENTION

This invention relates to devices for testing electrical wire or cable, usually either during or immediately after manufacture, to search for faults in the insulation, and deals more particularly with such devices wherein high voltage impulses are applied to the outer surface of the insulation by a suitable electrode and faults detected by sensing the power supplied to the electrode.

It is well known to test the integrity of the insulating sheath applied to an electrical conductor by applying a high voltage to the outside surface of the insulation so as to create a spark or arc when an imperfection appears at the point where the high voltage is applied. Both direct current and alternating current potentials have been used in such testing in the past and in the case of alternating current potentials, various different ranges of frequency have been used. At present, the use of alternating current potentials is generally preferred over direct current potentials for many applications, but most prior art devices utilizing alternating current potentials have used potentials with a generally sinusoidal waveform and have a tendency to generate an undesirable amount of heat. To overcome this heating problem, some recent testing devices have utilized output waveforms consisting of pulses which reduce the duty cycle.

This invention relates to an improved impulse tester wherein an accurately maintained high peak test voltage is applied to the insulation despite changes in the line voltage or the load and also whereby a brief electrical arc occurring in the electrode may be easily distinguished from normal electrode current as well as from current fluctuations resulting from unavoidable lateral vibration of the wire as it passes through the electrode. A further aim of the invention is to provide an impulse wire tester using a capacitor discharge circuit for generating the voltage pulses and which allows the primary supply power of the device to be switched on and off while providing for a nearly instantaneous buildup of the impulse test potential without surges and a freedom from false indications of failure during the switching periods.

SUMMARY OF THE INVENTION

A capacitor is repeatedly charged from a source of direct current potential and discharged through the primary winding of a step-up transformer to produce high voltage impulses in the secondary winding which are applied to an electrical conductor, such as a wire or cable, for the purpose of detecting faults in its insulation. Output voltage is metered by metering the peak voltage developed in a tertiary winding of the transformer. The transformer secondary winding and electrode-to-wire capacitance form an L-C parallel resonant circuit with a natural frequency of about 2 kilohertz. Negative and positive peak detectors are used to compare the initial impulse to the first oscillatory overshoot generated by this circuit so as to obtain a measure of damping or power loss in the electrode-to-wire circuit. When a predetermined degree of damping is reached, an associated fault indicator is actuated.

DESCRIPTION OF THE PREFERRED EMBODIMENT

Figures 1, 2:
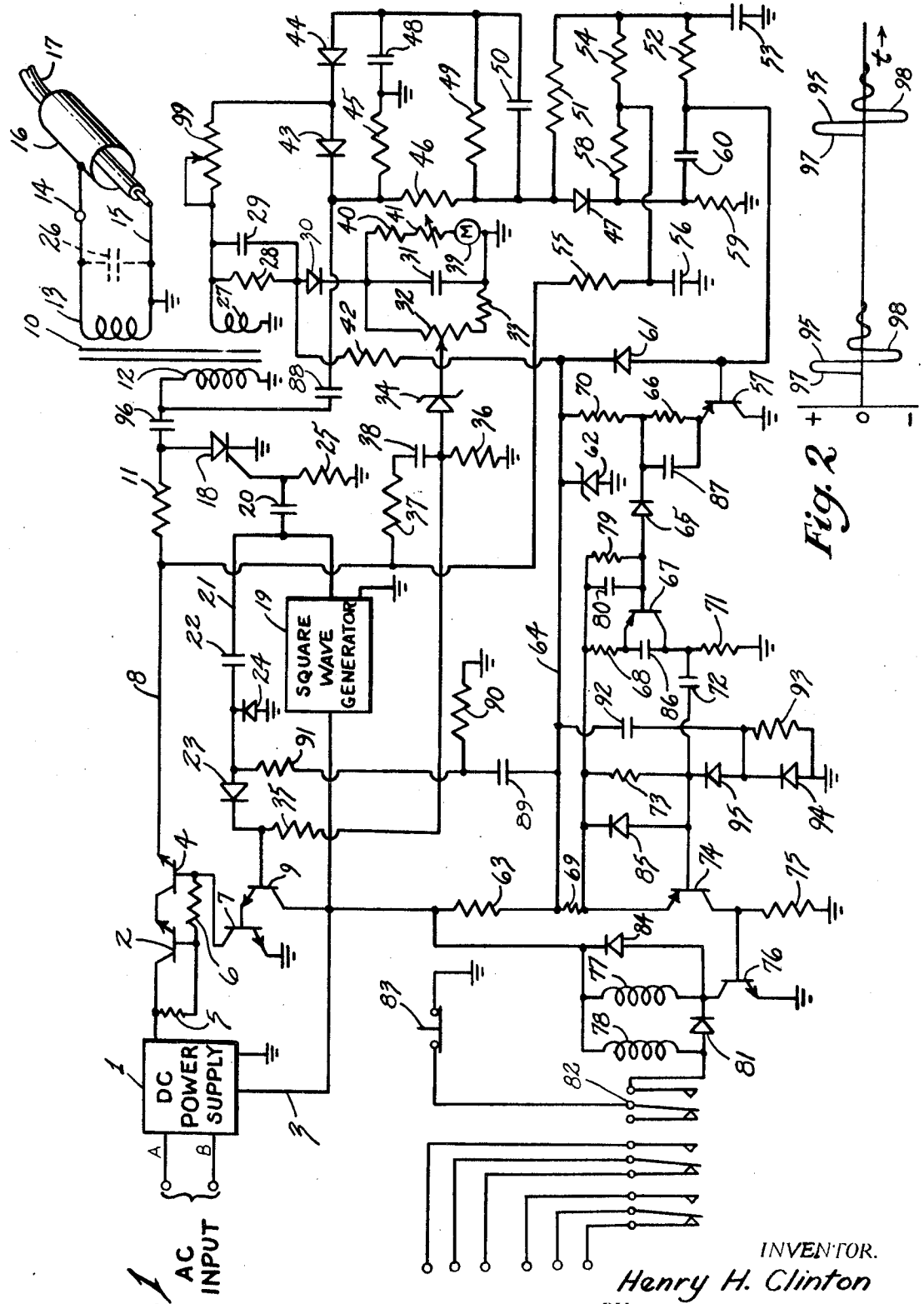
FIG. 1 is a schematic wiring diagram of a capacitor discharge impulse wire testing device embodying the present invention.
FIG. 2 is a diagram showing the voltage waveform appearing across the tertiary winding of the transformer of the device of FIG. 1 during normal operation thereof.

Turning to the drawing, which illustrates schematically a capacitor discharge impulse wire tested embodying this invention, the device shown is energized by alternating current power supplied to two input terminals A, B, the input power being, for example, a conventional 120 volt 60 Hz. supply. This alternating current supply is converted to filtered direct current power by a power supply 1 which supplies a first positive potential of several hundred volts, for example 250 volts, to the collector of a regulating transistor 2 and a second positive potential of low voltage, for example 18 volts, to the line 3 for energizing various parts of the circuit hereinafter described.

The higher output voltage of the power supply 1 serves as an input to an associated voltage regulator consisting of two series connected regulating transistors 2 and 4. A resistor 5 is connected between the collector and base of the transistor 2 and a resistor 6 is connected between the bases of the transistors 2 and 4. Another transistor 7 is connected to the base of the transistor 4 as shown. The two resistors 5 and 6 cause the voltage drop across the regulator to be divided generally equally between the two transistors 2 and 4 and, from the arrangement shown, it will be evident that the conduction of the two transistors 2 and 4, and therefore, the regulated output voltage appearing on the regulator output line 8, is determined by the conduction of the transistor 7. The conduction of the transistor 7 is in turn determined by that of an associated transistor 9 connected to its base terminal.

The regulated DC voltage appearing on the regulator output line 8 serves as a supply for a circuit capable of producing output voltage impulses, applied to the conductor under test, the peak value of which is related to the direct current input voltage so that by varying the input voltage the peak output voltage may be controlled. Such impulse producing circuit may take various different forms without departing from some of the broader aspects of this invention but preferably and as disclosed it is a capacitor discharge system wherein a capacitor is repeatedly discharged through the primary winding of a step-up transformer to produce high voltage impulses across the secondary winding of such transformer. In the drawing, the capacitor discharge system includes a capacitor 96 and a step-up transformer 10. The capacitor 96 is connected to the output of the voltage regulator through a resistor 11 and is connected in series with the primary winding 12 of the transformer 10. The secondary winding 13 of the transformer has one end directly connected to one output terminal 14 and has its other end connected to ground. The output pulses produced by the device appear at the two output terminals 14 and 15 and these terminals are connectible to the load which is usually substantially capacitive in nature, it being understood that the load generally constitutes a suitable electrode 16, through which the conductor 17 under test is run, and the conductor itself.

The charging and discharging of the capacitor 96 is controlled by a triggered electronic switch which may be a thyratron but which preferably and as shown is a silicon controlled rectifier 18. Triggering pulses for turning on the silicon controlled rectifier 18 are provided by a free running multivibrator or other recurrent square wave generator 19. The positive side of the multivibrator 19 is connected to the low voltage supply line 3. The multivibrator 19 produces pulses of generally rectangular waveform with a repetition rate being somewhere within the audio range of 60 to 2,000 c.p.s., a rate of about 500 c.p.s. being presently preferred. The rapid positive going transitions are differentiated by a capacitor 20 and the gate resistance of the silicon controlled rectifier 18, the capacitor 20 being connected at one side to the line 21 and on the other side to the gate of the silicon controlled rectifier. Another differentiation circuit is provided by a capacitor 22 in conjunction with the base input resistance of the transistor 9, the capacitor 22 having one side connected to the line 21 and the other side connected to the base of the transistor 9 through a diode 23. A path for restoring charge on the capacitor 22 is provided by an additional diode 24, and a path for restoring charge on the capacitor 20 is provided by a resistor 25. It will, therefore, be understood that as a result of the differentiation of the waveform appearing on the line 21 sharp triggering pulses of short duration are produced at the gate terminal of the silicon controlled rectifier 18 for turning it on at the instant each such pulse appears.

In the normal operation of the capacitor discharge system, the capacitor 96 is charged to a potential of several hundred volts by the regulated DC supply voltage produced by the voltage regulator on the line 8 and is then discharged through the primary coil 12 of the transformer 10 when the silicon controlled rectifier 18 is switched to a conducting state by a pulse appearing at its gate terminal. This sudden discharging of the capacitor through the primary winding induces a high voltage in the secondary winding 13 having a relatively rapid rise time. As the magnetic flux in the transformer 10 decays, the inductance of the winding 13 resonates with the winding capacitance, indicated by the broken lines at 26, together with the electrode-to-wise capacitance, and produces a damped sinusoidal voltage waveform having a frequency of several kilocycles which is impressed on the electrode 16. This waveform, however, persists only for several cycles and is therefore in the nature of an impulse.

The output voltage waveform appearing across the secondary winding 13 is induced back in the primary winding 12 and reverses the anode potential of the silicon controlled rectifier 18 causing it to be turned off. After the silicon controlled rectifier 18 is turned off, the capacitor 96 again charges so that when the next triggering pulse is applied to the gate terminal of the silicon controlled rectifier it again discharges through the primary winding 12 to produce another output voltage impulse, the same process thereafter being repeated in timed relation to the triggering pulses to produce repeated impulses of output voltage applied to the electrode.

A circuit is also provided for sensing the peak output voltage from the transformer 10 and for controlling the regulated DC supply voltage so as to maintain such peak output voltage at a substantially constant level despite changes in the load and in the line voltage supplied to the main input terminals A, B. As part of such control circuit, the transformer 10 includes a tertiary winding 27 which is connected through a parallel resistor 28 and capacitor 29 to a peak voltage detector comprised of a diode 30 and capacitor 31. The voltage across the capacitor 31 is, therefore, representative of the peak positive voltage produced by the tertiary winding 27 and this in turn is directly related to the peak output voltage developed across the secondary winding 13. The peak voltage thus detected across the capacitor 31 appears across a series combination of resistors 32 and 33. The resistor 32 has a movable tap so that a selected portion of the detected voltage is applied through a Zener diode 34 and a resistor 35 to the base of the transistor 9 to control its conduction. The resistor 36 maintains a minimum current through the Zener diode 34 to maintain the diode 34 in a constant voltage drop condition.

As mentioned previously, the conduction of the transistor 9 controls the conduction of the transistor 7 and this in turn controls the conduction of the two series voltage regulating transistors 2 and 4 to control the regulated output voltage appearing on line 8. More particularly, the action of the circuit is such that any increase in the peak output voltage appearing across the secondary winding 13 also increases the peak voltage appearing across the tertiary winding 27 and the voltage appearing across the capacitor 31. As this latter voltage increases, the signal supplied to the base of the transistor 9 increases causing it to conduct more heavily and as a result increasing the conduction of the transistor 7. The heavier conduction of the transistor 7 in turn decreases the conduction of the transistors 2 and 4 and, therefore, reduces the regulated output voltage appearing on the line 8. The reduced voltage on the line 8 in turn reduces the value of the peak output voltage across the secondary winding 13 by reducing the voltage to which the capacitor 96 is charged during each cycle. It is, therefore, apparent that the peak output voltage applied to the load is regulated and maintained at a substantially constant value despite changes in the line voltge or the load current.

Connected with the feed back loop between the transformer 10 and the voltage regulator is a series RC circuit, comprised of a resistor 37 and a capacitor 38 in series, which compensates for phase shifts in the regulating loop and thereby prevents the loop from oscillating at some frequency.

The peak output voltage as detected by the capacitor 31 may be applied to a suitable meter to provide a visual indication of the peak output voltage. Such a meter is shown at 39 in the drawing and is connected to the capacitor 31 through two resistors 40 and 41, the resistor 41 being adjustable. The resistor 41 is adjusted to calibrate the meter to cause it to indicate the correct peak voltage at the output terminal 14. At this point, it should be noted that the tertiary winding 27 is particularly useful for the purpose of this output voltage metering since the leakage reactance and resistance of the primary winding 12 are eliminated from the measurement. Due to this leakage reactance and resistance, the errors introduced if the voltage across the primary winding 12 is used to measure the output voltage are too great to meet commercially acceptable standards. Also, the voltage appearing at the output terminal 14 is too high to measure accurately by any simple and practical means.

To improve the linearity of the volt meter circuit when reading the voltage across the capacitor 31 a resistor 42 is connected between the low voltage supply line and the anode of the diode 30 to compensate for the voltage drop across the latter diode.

One problem with the use of a silicon controlled rectifier in a capacitive discharge system of the type previously described is that it is possible for it to be triggered to an on condition by a stray or spurious triggering signal occurring at such a time as to prevent it from thereafter being turned off. For example, as previously mentioned, the damped sinusoidal waveform induced back in the primary winding 12 is used to reverse the anode potential to turn off the silicon controlled rectifier 18. After the element 18 is turned off, the capacitor 96 is recharged during a brief interval before it is again turned on. If, however, some stray electrical transient should retrigger the silicon controlled rectifier immediately after the capacitor is discharged and before it has had an opportunity to recharge, it may thereafter remain in its on condition since the capacitor is unable to supply the power necessary for energizing the transformer 14 to produce the reflected waveform necessary for turning it off.

To prevent this condition from happening, the device illustrated in the drawing includes a circuit operable on the voltage regulator to reduce the voltage appearing on the line 8 to nearly zero during each cycle. Accordingly, if the silicon controlled rectifier should happen to lock in an on condition, its anode current is made to fall below the value required to sustain conduction during the next triggering pulse applied to its gate and, therefore, it must turn off.

The circuit for accomplishing this consists of the capacitor 22, and associated diodes 23 and 24, connected between the square wave generator 19 output and the base of the transistor 9. During each cycle of operation, the capacitor 22 applies a positive pulse to the base of the transistor 9 and as a result of this reduces the conduction of the regulating transistors 2 and 4 to reduce the regulated voltage appearing on the line 8 to a nearly zero value, thereby forcing the silicon controlled rectifier 18 to turn off if in an on condition.

The voltage appearing at the tertiary winding 27 is also used as the input to the fault detecting circuit which acts to discriminate between a waveform having a normal amount of damping and one having a high amount of damping as the result of power dissipation in the electrode two-wire circuit. Before considering the fault detecting circuit, however, reference is made to FIG. 2 which illustrates the general appearance of the voltage waveform normally appearing at the tertiary winding. As shown by this figure, and as previously explained, the waveform consists of impulses 95, 95 recurring at regularly spaced intervals and each consisting of an initial positive pulse 97 followed by a negative overshoot pulse 98, followed in turn by several more insignificant negative and positive overshoot pulses of considerably smaller amplitude. The initial positive pulse 97 appears during the conduction of the silicon controlled rectifier 18 which is turned off at the end of this pulse, and the negative overshoot pulse 98 is, as explained, produced by the resonant circuit provided by the transformer secondary winding and the load connected thereto. The amount of damping present in this resonant circuit controls the amplitude of the overshoot pulse 98. In FIG. 2, the amplitude of each illustrated overshoot pulse 98 is such in relation to the amplitude of the associated initial pulse 97 as obtained with a conductor having sound insulation in the vicinity of the electrode 16. When a faulty piece of insulation appears at the electrode, however, power is dissipated between the electrode and the conductor, with the result that the damping of the resonant circuit is also increased so that the amplitude of each resonant overshoot 98 is decreased.

The fault detecting or discriminator circuit, as shown in FIG. 1, includes two diodes 43 and 44 connected to the positive side of the tertiary winding 27 through a rheostat 99. During each impulse 95, the positive initial pulse 97 first appears across resistor 45 by conduction of the diode 43. A reduced amplitude version of this pulse also appears at the anode of diode 47 which is connected to resistor 45 by a voltage divider composed of resistors 46 and 49. The first resonant overshoot pulse 98 then follows the initial pulse 97 and since this overshoot pulse is of negative polarity, diode 44 conducts, charging capacitor 48 to a value nearly equal to the crest of the overshoot. This negative voltage is applied to the anode of diode 47 through the voltage divider composed of resistors 46 and 49. Capacitor 50 slows the rise time of the positive pulse derived from diode 43. The divided positive voltage supplied by the divided initial positive pulse and the divided negative voltage supplied from the capacitor 48 are added at the anode of diode 47, and the voltage divider composed of resistors 46 and 49 is adjusted so that, during normal operation when a conductor with sound insulation is present in the electrode 16, the negative charge on capacitor 48 decays slightly in the interval between impulses and so that the amplitude of the divided positive pulse from diode 43, when it appears, is just equal to or very slightly less than the divided negative voltage supplied from capacitor 48 at that instant. Thus the anode of diode 47 remains negative with respect to ground reference under normal conditions and the diode 47 does not conduct. If an arc occurs between the electrode 16 and conductor 17 under test, however, as a result of a fault in the conductor insulation, the unusual power loss is evidenced in the resonant circuit formed by the transformer secondary winding 13 and the electrode-to-wire capacitance. The effect of this power loss is to damp much more quickly than normal the oscillatory waveform or impulses produced by the action of the transformer 13 and its associated circuitry. As a result, the first resonant overshoot pulse 98 of each impulse is substantially reduced in amplitude and accordingly the capacitor 48 is charged to a lower value of negative voltage during each overshoot pulse 98. The amplitude of the initial pulse 97 is not as severely effected by the power dissipation in the resonant circuit and, therefore, the negative voltage on capacitor 48 decreases proportionately more than the positive impulse from diode 43. Therefore, when the divided positive pulse appears at the anode of diode 47 it is added to a smaller divided negative voltage from the capacitor 48 with the result that the anode of diode 47 reaches a positive potential during part of the electric cycle.

The anode of diode 47 is connected through resistor 51 to capacitor 53, which by its storage action assumes a voltage across its terminals corresponding to the average DC voltage level at the anode of diode 47. This potential, however, is partially reduced by the current flowing from positive supply line 8 through resistors 54 and 55. Any AC signal on line 8 is removed from this biasing current by capacitor 56. Component values are adjusted so that the resulting voltage on capacitor 53 with respect to ground is slightly negative for any value of impulse voltage appearing at the output terminal 14. This negative voltage causes a current flow through resistor 52 to the base of PNP transistor 57, which is thus held in the on condition.

The cathode of diode 47 is biased to a slight positive potential by the combination of resistor 59 and resistor 58, which is connected through resistor 55 to positive supply line 8. This potential varies in proportion to the potential on line 8 and thus in proportion to the amplitude of the impulse appearing at terminal 14.

Turning to the fault indicating circuit, a constant positive potential is held on line 64 by the Zener diode 62, which is held conducting by current from line 3 flowing thru resistor 63. Under normal conditions—that is when no fault is detected in the conductor under test the transistor 57 is held in full conduction by the negative voltage on its base. Its emitter is therefore normally maintained substantially at ground potential. Also under normal conditions the cathode of diode 65 is held to a slightly positive potential by the voltage dividing action of resistors 66, 68, and 69, while the diode 65 and the base-emitter junction of transistor 67 are in a forward conducting state. Resistor 70 also adds to the current through resistor 66. Transistor 67 is in an on condition and the top of resistor 71 therefore is held at some positive value. Capacitor 72 is connected to the base of transistor 74 and through resistor 73 to the junction of resistors 68 and 69, so that both its terminals are at substantially the same potential. The emitter of transistor 74 connects also to the junction of resistor 68 and 69, so that both its base and emitter terminals are at the same potential. Since transistor 74 does not conduct at this time, there is no current flow through resistor 75 which connects the base-emitter terminals of transistor 76. Transistor 76 is thus also in a non-conducting condition, so that the fault indicators, an electromechanical counter whose actuating coil is shown at 77 and a relay whose actuating coil is shown at 78 are not actuated.

Returning to the aforementioned positive signal which appears at the anode of diode 47 whenever an arc occurs in the insulation of the conductor 17 under test, when this signal is sufficiently positive to overcome the delay bias on the cathode of diode 47, this diode conducts, producing a positive pulse of voltage at its cathode. This pulse is communicated through capacitor 60 to the base of transistor 57 so as to reduce momentarily the conduction of transistor 57. Diode 61 prevents the base of transistor 57 from being carried to a positive potential greater than the voltage maintained on line 64.

The emitter of transistor 57 thereupon rises to a positive potential, carrying the cathode of diode 65 positive, bringing diode 65 to a non-conducting condition. Capacitor 80 discharges through resistor 79 in the base-emitter circuit of transistor 74, which ceases conduction. Capacitor 72 is then allowed to charge through resistor 71, the parallel combination of resistor 73 and the base-emitter junction of transistor 74, and resistor 69. Transistor 74 comes into conduction, causing current to flow in resistor 75 and in the base-emitter junction of transistor 76. The potential at the emitter of transistor 74 decreases sharply because of the increased current in resistor 69. The base and emitter terminals of transistor 67 are carried to this decreased potential, further increasing the reverse voltage across diode 65, thus making the subsequent operation of the circuit independent of the further action of transistor 57. Transistor 76 conducts, energizing counter coil 77 and relay coil 78 through diode 81, thus indicating a fault. A set of normally open contacts 82 of the relay 78 close, placing ground potential at the lower end of the coil of relay 78 through a normally closed push button 83.

When capacitor 72 completes its charge, transistor 74 ceases to conduct. This stops the conduction of transistor 76 and de-energizes the counter coil 77. Diode 84 prevents the inductance of the counter coil 77 from damaging transistor 76 by the generation of a voltage transient. The relay coil 78 remains energized, however, being held energized by the current flowing through the now closed contact set 82 and push button 83.

Because of the halting of conduction in transistor 74, the voltage drop across resistor 69 decreases. If a fault is still present in the electrode 16, the conduction of transistor 57 is still at a relatively low value, and transistors 67 and 74 remain in the off condition, while capacitor 72 remains fully charged. If, on the other hand, the fault is out of the electrode, transistor 57 conducts heavily, restoring the current through diode 65 and the base of transistor 67. Capacitor 72 discharges rapidly through transistor 67 and diode 85.

Capacitor 86 is connected between the emitter and collector of transistor 67 and reduces the tendency of the circuit to respond to stray signals coupled in by spurious paths. Capacitor 87 shunts resistor 66 and increases circuit gain for fault signals with fast rise times. A variable resistor or rheostat 99 may be used in series with the tertiary winding 27 and the diodes 43 and 44 to vary the negative voltage on capacitor 48 so as to vary the sensitivity of fault detection. It is thus seen that the counter 77 is energized only once during the passage of a fault through the electrode 16, and that the interval of energization is determined only by the charging time of capacitor 72.

In the event bare wire passes through the electrode 16, the output terminal 14 may be directly grounded, short circuiting the secondary winding 13. In this event the voltage in the tertiary winding 27 vanishes, preventing the proper functioning of the fault detecting circuit. To register a fault under these circumstances, a capacitor 88 is connected from the transformer primary winding 12 to the junction of diode 43 and resistors 45 and 46. Under the bare wire circumstance, a large, fast rise time waveform is still present at the top of the primary winding 12. A positive pulse appears at the anode of diode 47 because of the rectifying action of diode 43 and the charging of capacitor 88. This positive pulse passes through diode 47 and capacitor 60 to actuate the fault indicating circuits.

In many applications of the spark testing device it is often desired that the primary power of the equipment be switched off and on with other machinery. It is further required that the test voltage be brought to its correct value without surges and that no false indications of failure occur during such switching. A capacitor 89 is connected from positive line 64 through resistor 91 and diode 23 to transistor 9. When the equipment is first turned on, the charge of capacitor 89 turns transistor 9 on, keeping the impulse voltage at output terminal 14 low until capacitor 89 is fully charged, at which point the output voltage is regulated by means stated hereinbefore. The resistor 90 serves to discharge capacitor 89 when the power is switched off.

Capacitor 92 is connected from the same positive line 64 through diode 95 to the base of transistor 74. When power is first applied, capacitor 92 keeps the base of transistor 74 positive and prevents the transistor from conducting, thus preventing a false indication of failure when the equipment is switched on. Resistor 93 then charges capacitor 92 so that diode 95 ceases to conduct. Diode 94 discharges capacitor 92 when the equipment is switched off.

I claim:

1. In a device for testing the insulation of an electrical conductor, the combination comprising: an electrode through which the conductor under test is passed, an impulse generating means for repeatedly producing high voltage impulses transmitted to said electrode for application by said electrode to the insulation of said conductor each of which impulses is in the form of a damped wave having an initial pulse of one polarity followed by a first overshoot pulse of opposite polarity, the amplitude of said overshoot pulses being a high percentage of the amplitude of said initial pulses when no insulation fault appears at said electrode and being a substantially lower percentage of the amplitude of said initial pulses when an insulation fault does appear at said electrode, means coupled with said genertting means for detecting said initial pulses and said overshoot pulses and for comparing the amplitude of said initial pulses with the amplitude of said overshoot pulses, and means connected with said detecting and comparing means and responsive to the comparison made thereby for indicating a fault when the amplitude of said overshoot pulses falls below a given predetermined percentage of the amplitude of said initial pulses.

2. The combination defined in claim 1 further characterized by said impulse generating means comprising a capacitor discharge circuit including a first capacitor, a transformer having a primary winding through which said capacitor is repeatedly discharged, a secondary winding adapted for connection with an electrode for applying said high voltage impulses to said insulation, and a tertiary winding, and means connecting said tertiary winding to said amplitude comparing means so that the voltage waveform appearing across said tertiary winding serves as an input to said amplitude comparing means.

3. The combination defined in claim 2 further characterized by said detecting and comparing means comprising a second capacitor, means connecting said second capacitor with said tertiary winding so as to charge said second capacitor during said overshoot pulses and to maintain it during the occurrence of each of said initial pulses at a level of charge dependent on the amplitude of said overshoot pulses, and summing means connected with said tertiary winding and with said second capacitor for adding the charge of said capacitor to another voltage signal having an amplitude proportionally related to the amplitude of said initial pulses, said means for indicating a fault comprising means operable to indicate a fault when said summation exceeds a predetermined value.

4. The combination defined in claim 3 further characterized by means providing a source of direct current potential, a voltage regulator means connected with said source of direct current potential and responsive to a control voltage for providing a regulated direct current potential, means connecting said first capacitor to said voltage regulator means so as to be charged by said regulated direct current potential, a triggered electronic switch device connected with said first capacitor for controlling the charging of said first capacitor from said regulated direct current potential and the discharging of said capacitor through said primary winding of said transformer, means for repeatedly providing triggering pulses for said switch device, and means for controlling the value of the control voltage applied to said regulator means to vary the magnitude of said regulated direct current potential in response to changes and the peak value of the voltage appearing across said tertiary winding.

5. The combination defined in claim 4 further characterized by said summing means including a summing point at which the sum of the voltage added thereby appears, a diode connected with said summing point arranged to conduct when the voltage at said summing point exceeds a predetermined value, means for producing a voltage pulse when said diode switches from a non-conducting to a conducting state, and said fault indicating means comprising means responsive to such voltage pulse for indicating a fault.

6. The combination defined in claim 5 further characterized by means including a capacitor connected between said primary winding and said summing point for causing said diode to conduct and produce a voltage pulse such as aforesaid and in the event no output waveform of significant amplitude appears at said tertiary winding as a result of a shorted condition of said secondary winding.

7. The combination defined in claim 5 further characterized by said fault indicating means including a first normally conducting transistor biased toward a non-conducting state by said voltage pulse, a diode normally conducting state by said pulse, a second normally conducting said first transistor so that the current therethrough is reduced as said first transistor is biased toward a non-conducting state by said pulse, a second normally conducting transistor having its base terminal connected with said diode so that as the current through said diode is reduced the biasing current through said second transistor is also reduced to bias said second transistor to a non-conducting state, a third normally non-conducting transistor, a capacitor connected between the base of said third transistor and the collector terminal of said second transistor for controlling the bias of said third transistor and which capacitor is charged as said second transistor is switched from a conducting to a non-conducting state with the charging current therethrough momentarily biasing said third transistor to a conducting state, and a fault registering device responsive to the conduction of said third transistor for indicating a fault.

8. The combination defined in claim 7 further characterized by a capacitor connected between said source of direct current potential and the base of said third transistor which capacitor charges as said direct current power source is switched from an off condition to an on condition and applies during said charging a bias to the base of said third transistor thereby preventing said third transistor from conducting during said charging and thus preventing a false indication of failure immediately after said direct current potential source is turned on.

9. The combination defined in claim 4 further characterized by means for bringing said high voltage impulses up to a proper operating value without surges, said means comprising means for slowly increasing the control voltage applied to said voltage regulating means immediately after power is initially supplied from said direct current source.

10. In a device for testing the insulation of an electrical conductor the combination comprising: a source of direct current potential which may be switched between on and off conditions; a voltage regulator means connected with said source of direct current potential for providing a regulated direct current potential the value of which is related to the value of a control voltage applied to said regulator means; a capacitor connected with said voltage regulator means so as to be charged by said regulated direct current potential; a transformer having a primary winding connected in series with said capacitor, a secondary winding adapted for connection to a load, and a tertiary winding; a silicon controlled rectifier connected with said capacitor and said primary winding for controlling the charging and discharging of said capacitor; means providing a source of pulses for triggering said silicon controlled rectifier; means for detecting the peak voltage appearing across said tertiary winding, means connected with said peak voltage detector and with said voltage regulating means and responsive to the output of said peak voltage detector for providing said control voltage applied to said voltage regulating means and for controlling the value of said control voltage in such a manner that said regulated direct current potential is decreased as said detected peak voltage increases; and surge reducing means connected between said control voltage providing means and said source of direct current potential for additionally controlling said control voltage providing means and responsive to the turning on of said source of direct current potential to control said control voltage providing means so as to apply a high control voltage to said voltage regulating means at the instant said source of direct current potential is turned from an off condition to an on condition and for thereafter slowly removing said high control voltage so as to slowly bring said regulated direct current potential up to a normal operating value without surges.

11. The combination defined in claim 10 further characterized by said surge reducing means comprising a capacitor connected with said direct current power source and arranged to be charged from a discharged to a charged condition as said direct current power source is turned on, and said control voltage providing means including means responsive to the charging current through said capacitor for applying a control voltage to said voltage regulating means the magnitude of which control voltage is proportionally related to the magnitude of said charging current.

References Cited

UNITED STATES PATENTS

| | | | |
|---|---|---|---|
| 2,249,157 | 7/1941 | Morgan et al. | 324—55 |
| 3,339,136 | 8/1967 | Rasor et al. | 324—54 |
| 3,327,199 | 6/1967 | Gardner et al. | 307—297 XR |

GERARD R. STRECKER, Primary Examiner

U.S. Cl. X.R.

323—22

PO-1050
(5/69)

UNITED STATES PATENT OFFICE
CERTIFICATE OF CORRECTION

Patent No. 3,514,696           Dated May 26, 1970

Inventor(s)  Henry H. Clinton

It is certified that error appears in the above-identified patent and that said Letters Patent are hereby corrected as shown below:

Col. 3, line 53, "to-wise" should read --to-wire--.

Col. 4, line 39, "voltge" should read --voltage--.

Col. 8, line 56, "genertting" should read --generating--.

Col. 9, line 57, "state by said pulse, a second normally conduct-" should read --through the emitter to collector terminals of--.

SIGNED AND
SEALED

SEP 29 1970

(SEAL)
Attest:

Edward M. Fletcher, Jr.
Attesting Officer

WILLIAM E. SCHUYLER, JR.
Commissioner of Patents